(12) United States Patent
Ozsoylu et al.

(10) Patent No.: US 8,250,940 B2
(45) Date of Patent: Aug. 28, 2012

(54) SYSTEM AND METHOD FOR CONTROLLING CONTACT BETWEEN MEMBERS IN OPERABLE COMMUNICATION

(75) Inventors: Suat Ozsoylu, Rochester Hills, MI (US); Michael J. Augustine, Mayville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1125 days.

(21) Appl. No.: 11/489,761

(22) Filed: Jul. 20, 2006

(65) Prior Publication Data

US 2008/0041178 A1 Feb. 21, 2008

(51) Int. Cl.
*F16H 57/12* (2006.01)
(52) U.S. Cl. .............................. 74/425; 74/409; 74/411
(58) Field of Classification Search .............. 74/409, 74/425, 411
See application file for complete search history.

(56) References Cited

U.S. PATENT DOCUMENTS

| | | | | |
|---|---|---|---|---|
| 1,431,649 A | * | 10/1922 | Gillette | 74/721 |
| 2,006,896 A | * | 7/1935 | Joyce | 74/425 |
| 2,341,968 A | * | 2/1944 | West | 336/100 |
| 2,526,435 A | * | 10/1950 | Teigman | 476/5 |
| 3,123,173 A | * | 3/1964 | Jacobs | 180/343 |
| 3,220,277 A | | 11/1965 | Dixon | 74/89.42 |
| 3,463,030 A | | 8/1969 | Nuccel | 74/409 |
| 3,641,832 A | | 2/1972 | Shigeta et al. | 74/427 |
| 3,848,477 A | | 11/1974 | Giandinoto et al. | 74/425 |
| 3,851,538 A | | 12/1974 | Denkowski et al. | 74/425 |
| 4,040,307 A | * | 8/1977 | Koster | 74/425 |
| 4,227,104 A | | 10/1980 | Hamman | 310/75 R |
| 4,261,218 A | | 4/1981 | Eagan, Sr. | 74/409 |
| 4,586,393 A | | 5/1986 | Mooney et al. | 74/396 |
| 4,665,765 A | | 5/1987 | Heine | 74/458 |
| 4,748,865 A | | 6/1988 | Umezawa et al. | 74/411 |
| 4,777,411 A | | 10/1988 | OConnor et al. | 315/371 |
| 4,813,303 A | | 3/1989 | Beezer et al. | 74/425 |
| 4,885,948 A | | 12/1989 | Thrasher, Jr. et al. | 74/89.14 |
| 4,979,404 A | | 12/1990 | Nakata et al. | 74/409 |
| 4,989,472 A | | 2/1991 | James, Sr. et al. | 74/409 |
| 4,993,277 A | | 2/1991 | Adam et al. | 74/425 |
| 5,027,024 A | | 6/1991 | Slayton | 310/90 |
| 5,186,068 A | | 2/1993 | Heller | 74/425 |
| 5,295,730 A | | 3/1994 | Rees | 297/261.1 |
| 5,415,595 A | | 5/1995 | Nelson | 475/7 |
| 5,445,238 A | | 8/1995 | Chikuma et al. | 180/444 |
| 5,472,060 A | | 12/1995 | Sano et al. | 180/413 |
| 5,488,851 A | | 2/1996 | Rossi | 72/279 |
| 5,605,071 A | * | 2/1997 | Buchanan, Jr. | 74/425 |
| 5,794,480 A | | 8/1998 | Schonsteiner | 74/425 |
| 5,832,055 A | | 11/1998 | Dewaele | 378/62 |

(Continued)

FOREIGN PATENT DOCUMENTS

EP 0270159 6/1988

(Continued)

*Primary Examiner* — William C Joyce
(74) *Attorney, Agent, or Firm* — Cantor Colburn LLP (57) ABSTRACT

A system to control a contact force and a positional relationship between members in operable communication is provided. The system comprises a first member, a second member in operable communication with the first member, a contact force and a positional relationship existing between the first member and the second member. The system further comprises first biasing members being configured to bias and position the first member, the contact force and positional relationship being influenced by a response of the first biasing members to the contact forces between the members in operable communication.

17 Claims, 8 Drawing Sheets

U.S. PATENT DOCUMENTS

| | | | | |
|---|---|---|---|---|
| 5,834,662 A | | 11/1998 | Stoll et al. | 74/425 |
| 5,878,832 A | | 3/1999 | Olgren et al. | 180/444 |
| 5,887,353 A | * | 3/1999 | Beckingham | 33/292 |
| 5,893,427 A | | 4/1999 | Bohner et al. | 180/403 |
| 5,934,144 A | | 8/1999 | Marinkovic | 74/440 |
| 5,992,259 A | | 11/1999 | Fleytman | 74/425 |
| 6,003,397 A | | 12/1999 | Yasuhira | 74/425 |
| 6,016,716 A | | 1/2000 | Mauro | 74/409 |
| 6,044,723 A | | 4/2000 | Eda et al. | 74/388 PS |
| 6,170,350 B1 | | 1/2001 | Behm | 74/425 |
| 6,272,942 B1 | | 8/2001 | Ganser | 74/425 |
| 6,354,395 B1 | | 3/2002 | Cheng et al. | 180/444 |
| 6,357,313 B1 | | 3/2002 | Appleyard | 74/388 PS |
| 6,364,049 B1 | | 4/2002 | Iwasaki et al. | 180/444 |
| 6,386,059 B1 | | 5/2002 | Mittendorf et al. | 74/409 |
| 6,394,220 B1 | | 5/2002 | Kurokawa et al. | 180/444 |
| 6,460,650 B2 | | 10/2002 | Tsuboi et al. | 180/444 |
| 6,491,130 B1 | | 12/2002 | Honaga et al. | 180/444 |
| 6,491,131 B1 | | 12/2002 | Appleyard | 180/444 |
| 6,505,071 B1 | | 1/2003 | Zhu et al. | 607/28 |
| 6,515,915 B2 | | 2/2003 | Derner | 365/189.05 |
| 6,520,042 B2 | | 2/2003 | Jammer et al. | 74/425 |
| 6,523,431 B2 | * | 2/2003 | Ozsoylu et al. | 74/443 |
| 6,543,569 B1 | | 4/2003 | Shimizu et al. | 180/444 |
| 6,550,567 B2 | | 4/2003 | Murakami et al. | 180/444 |
| 6,639,760 B2 | | 10/2003 | Dyer et al. | 360/261.3 |
| 6,643,940 B1 | | 11/2003 | Donath et al. | 33/290 |
| 6,644,431 B2 | | 11/2003 | Kuze et al. | 180/444 |
| 6,679,350 B2 | | 1/2004 | Shimizu et al. | 180/446 |
| 6,705,176 B2 | | 3/2004 | Ishii et al. | 74/388 PS |
| 6,708,796 B2 | | 3/2004 | Kinme et al. | 180/444 |
| 6,725,964 B2 | | 4/2004 | Appleyard | 180/444 |
| 6,761,244 B2 | | 7/2004 | Sano et al. | 180/444 |
| 6,763,738 B1 | | 7/2004 | Tsutsui et al. | 74/388 PS |
| 6,769,507 B2 | | 8/2004 | Murakami et al. | 180/444 |
| 6,776,064 B2 | | 8/2004 | Bucholz et al. | 74/425 |
| 2002/0053249 A1 | | 5/2002 | Jammer et al. | 74/425 |
| 2002/0112555 A1 | | 8/2002 | Chikaraishi et al. | 74/425 |
| 2002/0148315 A1 | | 10/2002 | Mittendorf et al. | 74/425 |
| 2002/0195893 A1 | | 12/2002 | Kobayashi et al. | 310/425 |
| 2004/0026160 A1 | | 2/2004 | Shimizu et al. | 180/425 |
| 2004/0029678 A1 | | 2/2004 | Kayukawa et al. | 477/15 |
| 2004/0084865 A1 | | 5/2004 | Kitami et al. | 280/93.513 |
| 2004/0094353 A1 | | 5/2004 | Shimizu et al. | 180/444 |
| 2004/0163881 A1 | | 8/2004 | Shiina et al. | 180/444 |
| 2004/0210365 A1 | | 10/2004 | Tanaka et al. | 701/41 |

FOREIGN PATENT DOCUMENTS

| | | |
|---|---|---|
| EP | 1468897 | 4/2004 |
| EP | 1795778 | 6/2007 |
| WO | 01/25072 | 4/2001 |

* cited by examiner

SYSTEM AND METHOD FOR CONTROLLING CONTACT BETWEEN MEMBERS IN OPERABLE COMMUNICATION

BACKGROUND OF THE INVENTION

Backlash is a major source of undesirable noise in gear assemblies. Backlash allows the teeth of one gear to, momentarily, lose contact with the teeth of the mating gear. The noise is generated, by a tooth-to-tooth impact that occurs, when the teeth of the two gears reestablish contact with one another. The momentary loss of contact between meshing teeth often happens during specific operating conditions of the gear assembly. Such conditions include; during excessive vibration and during directional changes of at least one of the gears, for example.

Typical gear assembly design practices rely upon geometric tolerancing to position meshed gears in operable relation to one another. However, due to variation in build tolerances and component wear, clearances have to exist between the teeth of meshed gears, thereby allowing backlash, and the undesirable noise associated with it to persist.

In addition to noise, clearances may also cause degradation in operational efficiency of the meshed gears due to the contact point between the gear teeth deviating from the preferred design location. The contact force between the meshed gears is one major cause of this deviation. The contact force includes a radial component that acts in a direction to separate the gears from one another. Consequently, any clearances in the meshed gears may be biased to increase the distance between the axes of the gears resulting in reduced meshing engagement. The reduced meshing engagement alters the contact point between the meshed gears, which may result in a loss of efficiency and strength.

Typical methods employed to minimize these clearances include both springs and dampers. The springs are used to bias the gears toward one another in an attempt to assure that the gears are fully meshed together regardless of the clearances. However, the spring forces necessary to maintain the gears in full meshed engagement cause a loss in efficiency due to an increase in friction between the meshed gear teeth. Dampers are employed to allow for use of springs with lesser biasing forces. Such lighter force springs create a preload when the gears are not operationally engaged. A high damper stiffness is used to counter the separational forces of the meshed gears and to thereby reduce the backlash and loss of efficiency that results from the gears moving away from one another.

During operation, the load put on the dampers varies significantly as the operational conditions of the meshing gears change. For the dampers to successfully counter these varying forces the damper coefficients of the dampers must vary depending on the operating conditions of the gear assembly. It may be possible to create variable dampers, and algorithms to control them, based upon the operational conditions of the meshed gears. However, such systems may be highly complex, costly, and still have negative effects on the operational efficiency of the assembly.

Accordingly, there is a need in the art for a concept that automatically eliminates backlash and maintains a desired positional relationship of the meshing gears regardless of the operating conditions of the meshed gears.

BRIEF DESCRIPTION OF THE INVENTION

Disclosed herein is a system to control a contact force and a positional relationship between members in operable communication. The system comprising, a first member, a second member in operable communication with the first member, and a contact force and a positional relationship exists between the first member and the second member. The system further comprising first biasing members being configured to bias and position the first member, and the contact force and positional relationship are influenced by a response of the first biasing members to the contact forces between the members in operable communication.

Further disclosed is a method of controlling the contact force and positional relationship of operably communicating members. The method comprising, operably coupling a first member to a second member with biasing members such that an operational contact force and a positional relationship exists between the first member and the second member, and adjusting the operational position and contact force through response of the coupling of the first member to the second member.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
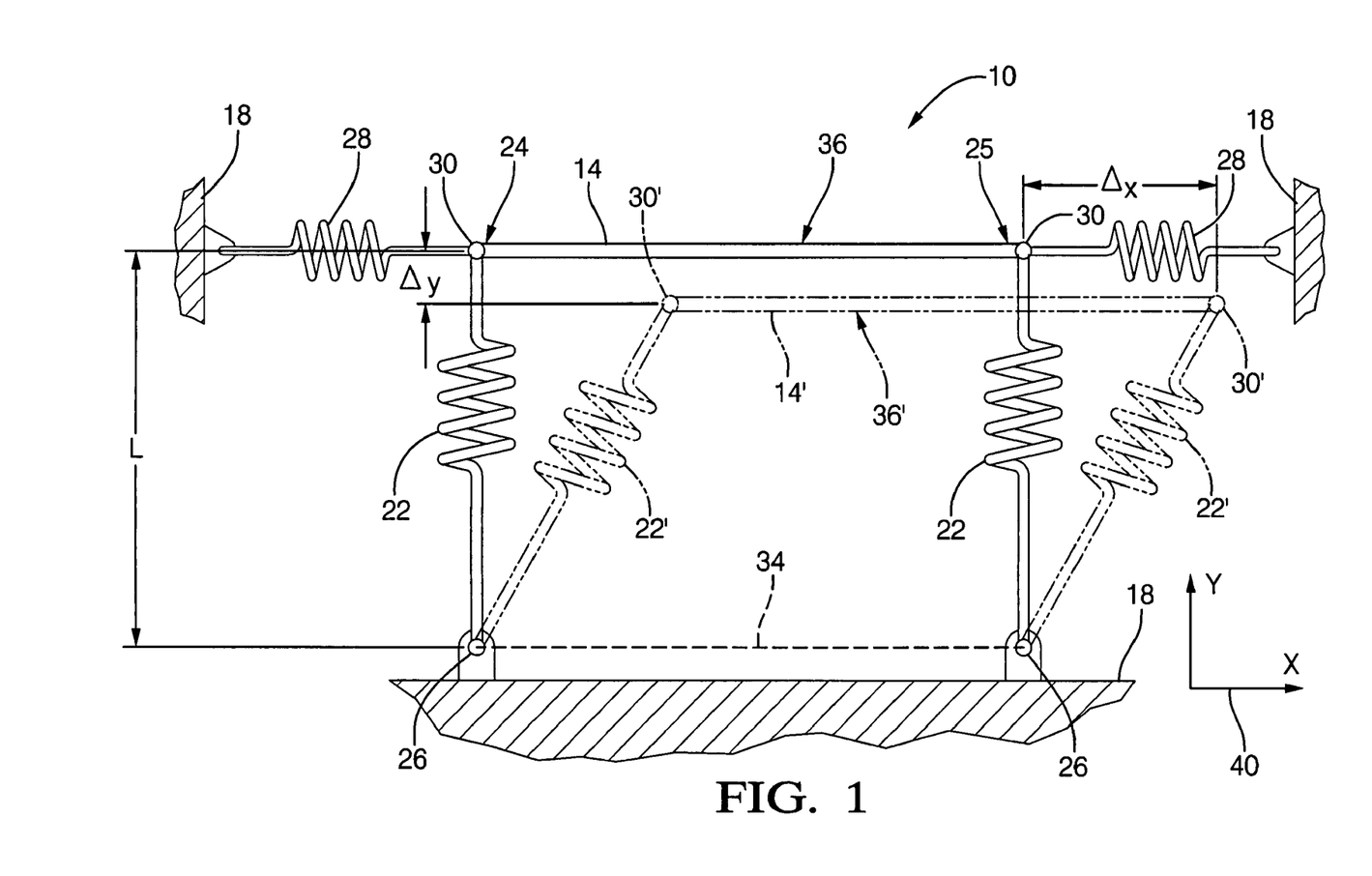
FIG. 1 depicts a schematic of linked members disclosed herein.

Referring to FIG. 1, a schematic 10 of a moveable first member 14 in accordance with an embodiment of the invention is depicted. First biasing members 22 attach opposing ends of the first member 14 to a housing 18. Each first biasing member 22 is rotationally attached to the housing 18, by a pivot 26, on one end, and to the first member 14, by a pivot 30, on the other end. The pivots 26 and 30 allow the first member 14 to move from a first position 36 to a second position 36'. The first member 14', the biasing members 22', and the pivots 30' are shown by dashed lines in the second position 36'. The structure thus described is similar to a parallelogram formed by a first pair of opposing sides made by biasing members 22' and a second pair of opposing sides made by the first member 14' and a dashed line 34 connecting pivots 26.

Of particular interest, in this embodiment, is the relationship of the first member 14, in the first position 36, as compared to the first member 14' in the second position 36'. Specifically, the geometric requirement that as the first member 14 is moved from the first position 36 to the second position 36' it undergoes movement in both an X and a Y displacement, if the biasing members 22 were rigid, according to a Cartesian coordinate system 40, as depicted by $\Delta x$ and Δy. This geometric relationship will be utilized to control operational contact forces and a positional relationship of the first member 14 with respect to a second member 44 as will be described in more detail below. Movement in the third dimension orthogonal to the X and Y axis may be adequately controlled and limited by conventional means of retaining the bearings 48, shown herein as ball bearings 49 in bearing housing 50 (FIG. 2), within the housing 18 and therefore will not be discussed in detail herein.

As mentioned above, the movement in the Y direction of Δy would occur if the members 22 were rigid, however they are not. Biasing members 22 are flexible along their length and provide an urging force against increases in length of members 22. Therefore, it is possible for the first member 14 to move from the first position 36 to the second position 36' while not moving in a Y direction at all. Without a movement in the Y direction the members 22 must increase in length as the first member 14 moves in an X direction. Such an increase in length is accompanied by an increase in force in the minus Y direction.

In addition to the urging forces in the Y direction generated by the biasing members 22 in response to movement of the first member 14 in an axial direction, there is an axial urging force generated by second biasing members 28. Second biasing members 28 pivotally connect opposing axial ends 24 and 25 of the first member 14 to the housing 18. The second biasing members 28 work together to increase the axial forces on the first member 14 in response to the first member 14 moving in an axial, or X, direction. The force versus displacement for all biasing members 22, 28 will be discussed with reference to FIG. 3 below.

Figure 2:
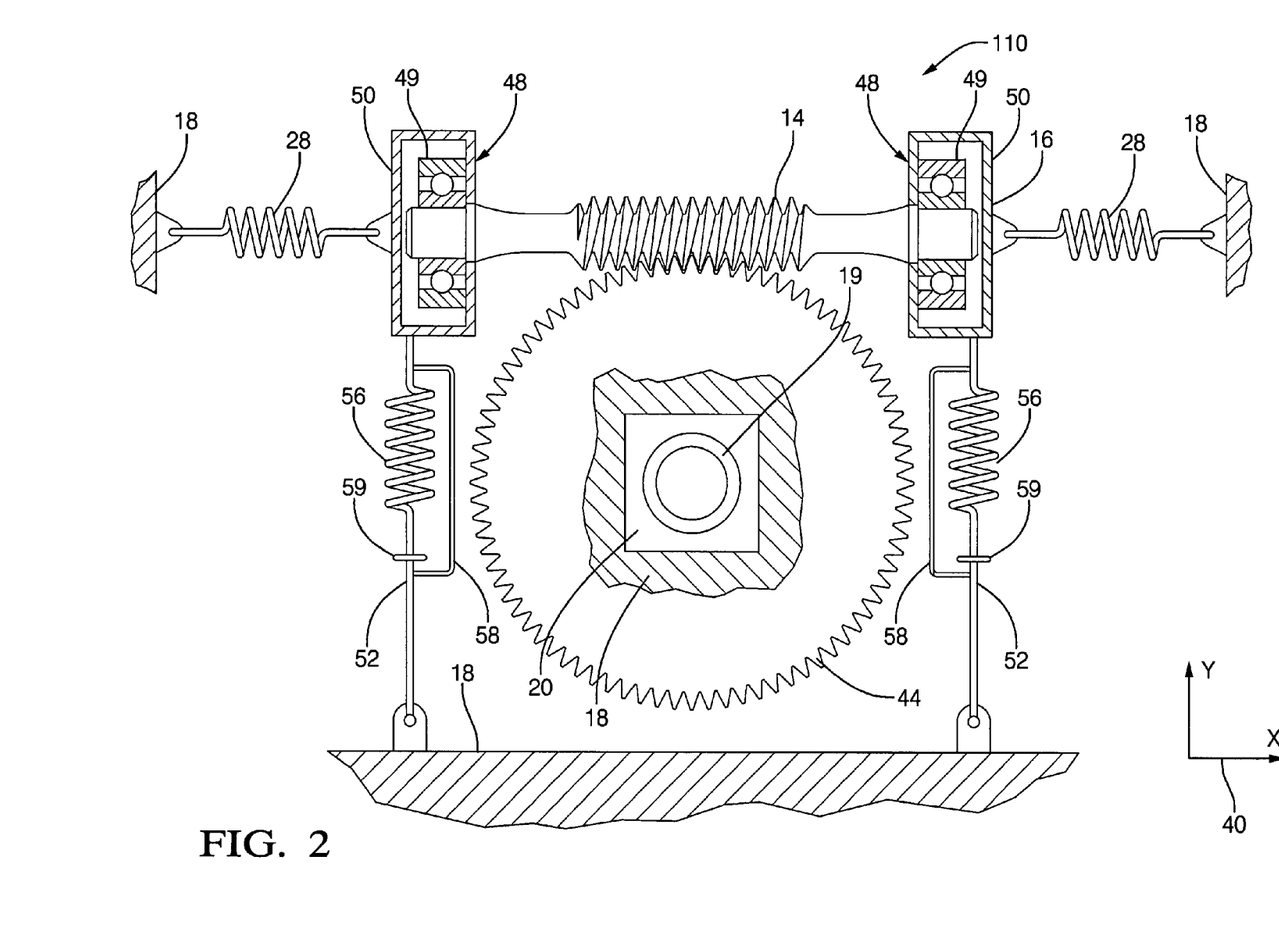
FIG. 2 depicts a diagram of operably communicating members with a preload biasing member disclosed herein.

Referring now to schematic 110 of FIG. 2, the first member 14 is in operable communication with the second member 44. The first member, represented here as a worm with a shaft 16, is rotationally attached to bearings 48. The second member 44, represented here as a worm gear with a shaft 19, is rotationally attached to a bearing 20 that is fixed to the housing 18. Although, the members 14 and 44 presented here are gears, they could also be cams or other operationally communicable members. The operational communication of the first member 14 and the second member 44 is by way of meshing of gear teeth as will be described in detail with reference to FIGS. 5 and 6. The positional relationship of the members 14 and 44 and the meshing engagement of their teeth is such that the rotation of either member 14 or 44 is necessarily accompanied by rotation of the other member.

Figure 3:
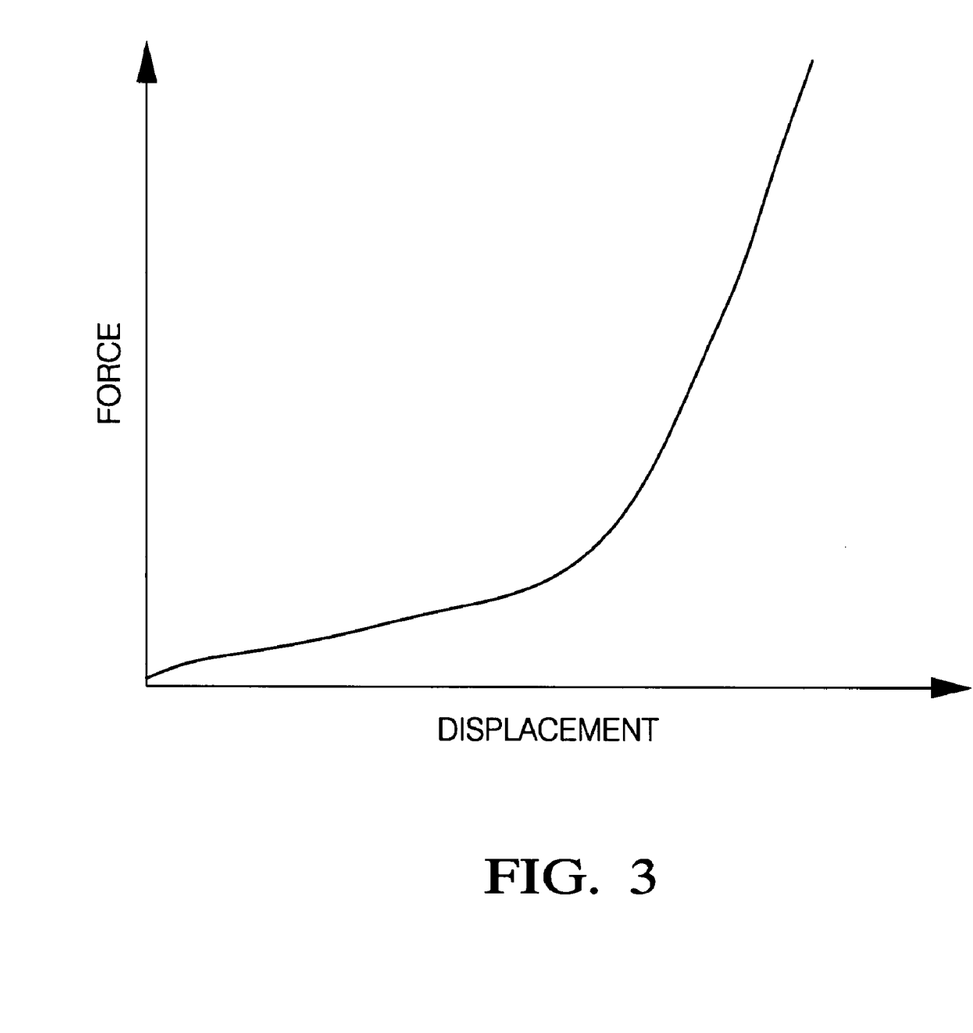
FIG. 3 depicts a graph of force versus displacement for biasing members disclosed herein.
Figure 5:
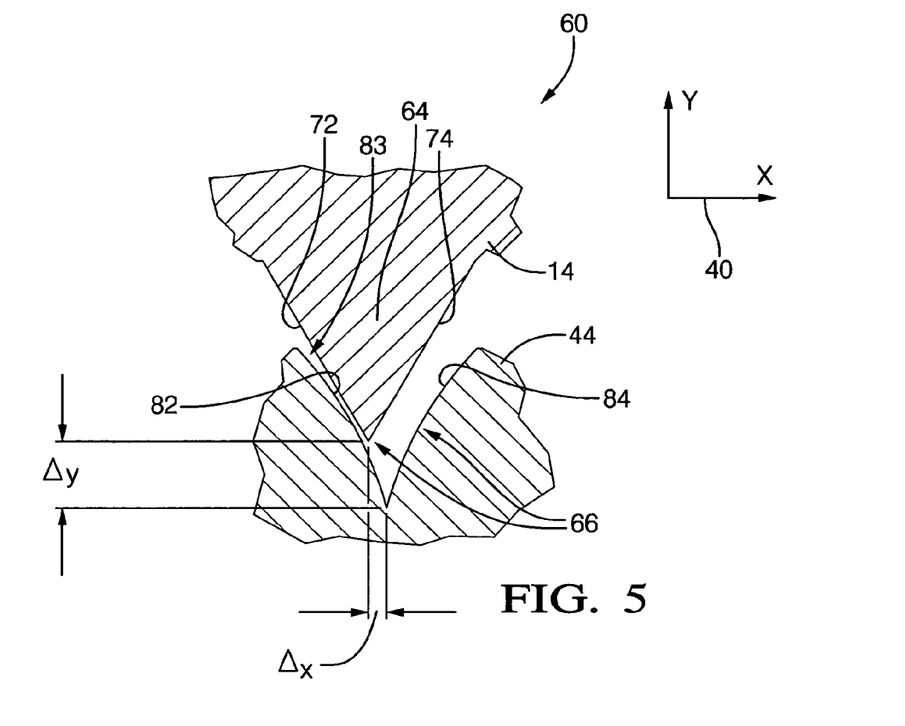
FIG. 5 depicts a diagram of gear teeth in mesh with single flank contact.

The operational communication results in forces, from the second member 44, acting on the first member 14 in both X and Y directions per the Cartesian coordinate system 40. A pair of second biasing members 28, shown here as springs, which bias the first member 14 relative to the housing 18, resists movement of the first member 14 in the X direction. First biasing members 52 anchor the first member 14 to the housing 18, and support third biasing members 56, shown here as springs, in resisting movement of the first member 14 in a plus Y direction, similar to the way biasing members 22 resisted movement of the first member 14 in reference to FIG. 1. However, the geometric requirement of the parallelogram intends to move the first member 14 in a minus Y direction in response to the first member 14 being moved in the X direction. This is shown in FIG. 1, where a minus Y movement, Δy, correlates with an X movement, Δx, according to the following formula if third biasing members 56 were rigid:

$$\Delta y = \left(1 - \sqrt{1 - \left(\frac{\Delta x}{L}\right)^2}\right) * L$$

where, L is the length of the biasing members 22. Accordingly, the forces acting on the first member 14 from the operational communication result in the first member 14 moving in a plus X direction and a corresponding minus Y direction, from a first operational position 36 to a second operational position 36'. The intended minus Y movement of the first member 14 moves the first member 14 towards the second member 44, thereby increasing the meshing engagement of the teeth 64, 66 if the third biasing members 56 were rigid. The third biasing members 56, however, are not rigid but are in fact flexible. The flexibility of the third biasing members 56 is controlled by the nonlinear spring constant referred to in FIG. 3. Thus, the flexibility of the third biasing members 56 actually allows the first member 14 to move in a plus Y direction instead of a minus Y direction, thus allowing a single flank contact to occur as shown in FIG. 5. This movement of the first member 14 in a plus Y direction results in an elongation of the biasing members 56 and a corresponding increase in the force in the minus Y direction created by the biasing members 56. This force in a minus Y direction will also be referred to as a mesh engaging force. The mesh engaging force increase, in the minus Y direction, resists a further decrease in meshing engagement that if allowed could be detrimental to efficiency.

Figure 4:
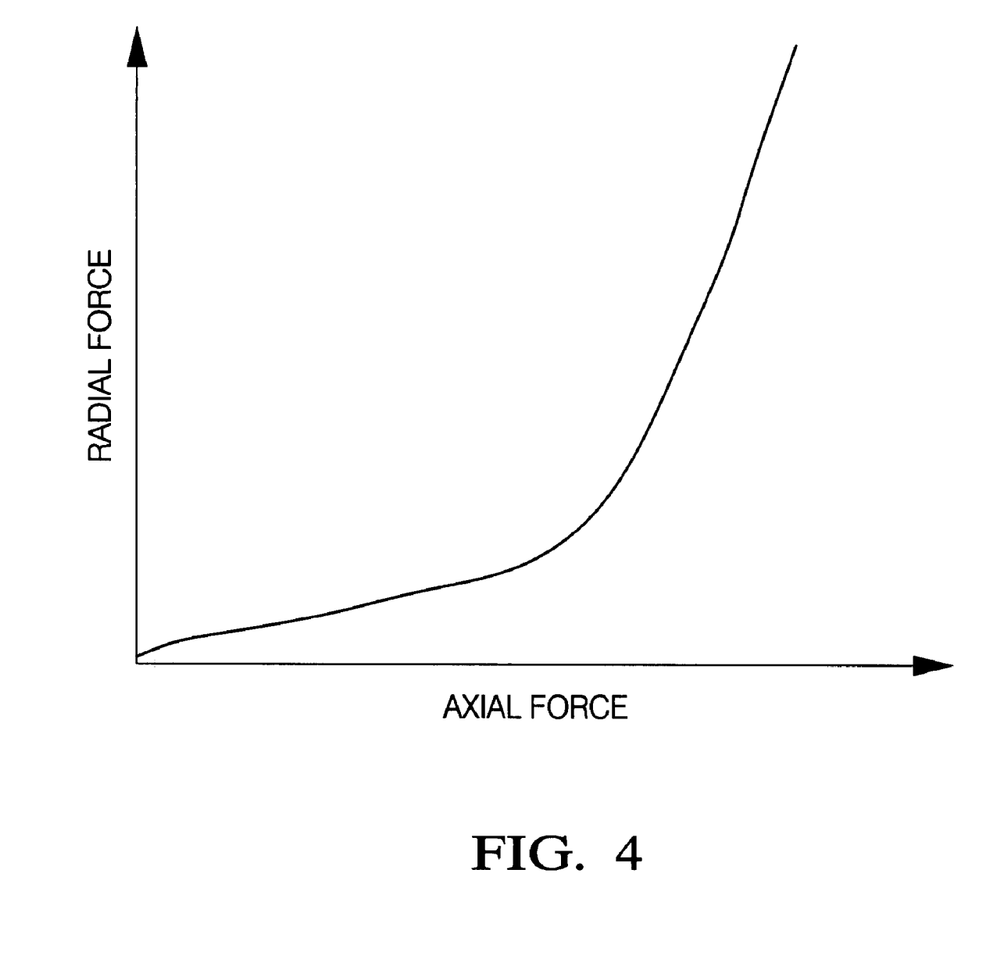
FIG. 4 depicts a graph of a force loop disclosed herein.

The novel mounting of the first member 14, of the embodiments disclosed herein, permit the force in the minus Y direction, generated by the third biasing members 56, to increase without requiring the first member 14 to move in a Y direction at all. This force increase results from a movement of the first member 14 in an X direction, which results in an elongation of the third biasing members 56 and a corresponding increase of force in the minus Y direction applied to the first member 14. Thus a force loop is created between the axial, X directional force, and the radial, Y directional force, of the contact force. The parameters of this force loop can be tailored for particular applications by adjusting the lengths of the biasing members 56, the force versus deflection curves of the biasing members 56 and the angles of contacting surfaces of the operably communicating members 14, 44, for example. Referring to FIG. 4 a graph of an exemplary force loop is depicted with radial force on the vertical axis and axial force on the horizontal axis. This curve is nonlinear with the radial force increasing at a faster rate than the axial force.

Figure 6:
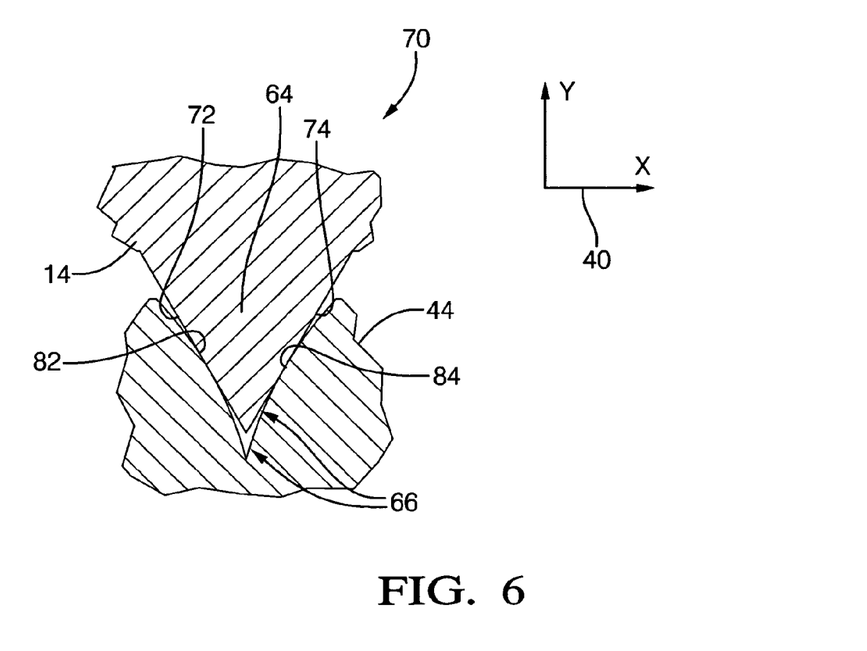
FIG. 6 depicts a diagram of gear teeth in mesh with double flank contact.

Referring to FIGS. 5 and 6, the meshing engagement of the first member 14 with the second member 44 described above will now be reviewed in greater detail. Diagram 60, of FIG. 5, depicts a partial meshing of a tooth 64 from the first member 14 with teeth 66 of the second member 44. The meshing teeth 64 and 66 are shown in single flank contact, such that a first flank 72 of the tooth 64 is in contact with a first flank 82 of the teeth 66, while a second flank 74 of the tooth 64 is not in contact with a second flank 84 of the teeth 66. Such single flank contact may result when operational contact forces between the meshing gear teeth 64, 66 force the first member 14 away from the second member 44. More specifically, the contact force causes the first member 14 to ramp up surface 83 of the first flank 82. However, as described in the above embodiment, a movement of the first member 14 in an X direction must also include an incremental force increase in the minus Y direction. The incremental force increase in the minus Y direction counters the separation forces between the first member 14 and the second member 44 thereby maintaining the members 14, 44 in a preferred meshing position. Therefore, the forgoing structure maintains a desirable positional relationship between the first member 14 and the second member 44 throughout various operational parameters of the first member 14 with the second member 44.

Referring to FIG. 6, a double flank contact of the first member 14 with the second member 44 is depicted in diagram 70. In the double flank contact, of diagram 70, the first flank 72 and the second flank 74, of the tooth 64, are in contact with first flank 82 and second flank 84, of the teeth 66, respectively. Double flank contact of meshing gears accompanied with relatively significant contact forces is undesirable due to inefficiencies resulting from higher frictional forces as compared to single flank contact. Single flank contact is the condition that exists when the operational contact between members 14 and 44 is in an off center position and double flank contact is the condition between members 14 and 44 when in an on center position with no external loading or motion present.

The single flank contact of diagram 60 has less frictional forces and therefore has higher efficiency than the double flank contact of diagram 70. However, single flank contact has the potential for noise during directional changes of the members 14, 44, or during vibration of the full assembly. In the case of a directional change of the first member 14, for example, there is potential for the tooth 64 to momentarily loose contact with the teeth 66. That is, the single flank contact between flank 72, of the tooth 64, and flank 82, of the teeth 66, may be broken before single flank contact is established between flank 74, of the tooth 64, and flank 84, of the teeth 66. This momentary loss of contact may cause an undesirable, "impact," noise to occur when contact is reestablished.

Referring again to FIG. 2, a schematic 110 of an embodiment of the invention, incorporating a preload to address a source of impact noise, is depicted. The urging force forms a preload generated by the third biasing members 56, incorporated into first biasing members 52, which connect the first member 14 to the housing 18 through bearings 48. The preload force of third biasing members 56 is set to maintain tooth 64 to teeth 66 contact at all times, and specifically during times of directional changes of the members 14, 44 and of vibration of the full assembly. In order to prevent the impact noise from occurring, the single flank contact between flanks 72, of the tooth 64, and flank 82, of the teeth 66 (FIG. 5) needs to be maintained until the double flank contact of FIG. 6 is established. Stated another way; impact noise may be minimized or prevented during transition from a single flank contact in one direction to a single flank contact in the opposite direction, by transitioning through a momentary double flank contact and minimizing the contact force at that instant.

Although it appears that at the precise moment when the double flank contact is attained, there may be an undesirable impact noise, the magnitude of such an impact may be controlled to a sufficiently low level to prevent it from being objectionable. This control is possible due to the force relationship between biasing members 28 and 56 and the length of member 52. Before the first member 14 can change direction it must first come to a momentary stop. At this instant as long as the natural frequency of member 14 combined with member 28 in the X direction is higher than the possible frequency that member 44 can achieve, the single flank contact condition will not change. Similarly, during vibration, the single flank contact is maintained as long as the biasing force, of the third biasing members 56, is enough to pull the first member 14 to the preferred position in the Y direction.

Although the preload in the foregoing embodiment is generated by the third biasing members 56, it could also be provided by the first biasing members 22 which has a biasing means incorporated therein. Similarly, alternate embodiments of first biasing members such as biasing members 122 of FIG. 7, for example, may provide the preload directly as well. Other alternative embodiments, as will be shown in reference to FIGS. 8 and 9, may incorporate third biasing members that create forces substantially perpendicular to the first biasing members while still creating the preload urging force described above.

In addition to providing preload forces, the biasing members may prevent excessive movement of the first member 14. Travel limiters 58 may be used in parallel with the third biasing members 56 of schematic 110. The bottoming out of the travel limiters 58 against hard stops 59 prevent further travel of the first member 14 away from the second member 44. A travel limiter 58 may be desirable to limit travel of the first member 14 that may be detrimental to performance of the assembly, for example. Travel limiters 58 that contact hard stops 59, however, may themselves result in audible noises depending on the speed of the travel limiters 58 when they make contact with the hard stops 59. Alternate embodiments that limit travel without hard stops 59 may be desirable and will be discussed in more detail below.

Figure 7:
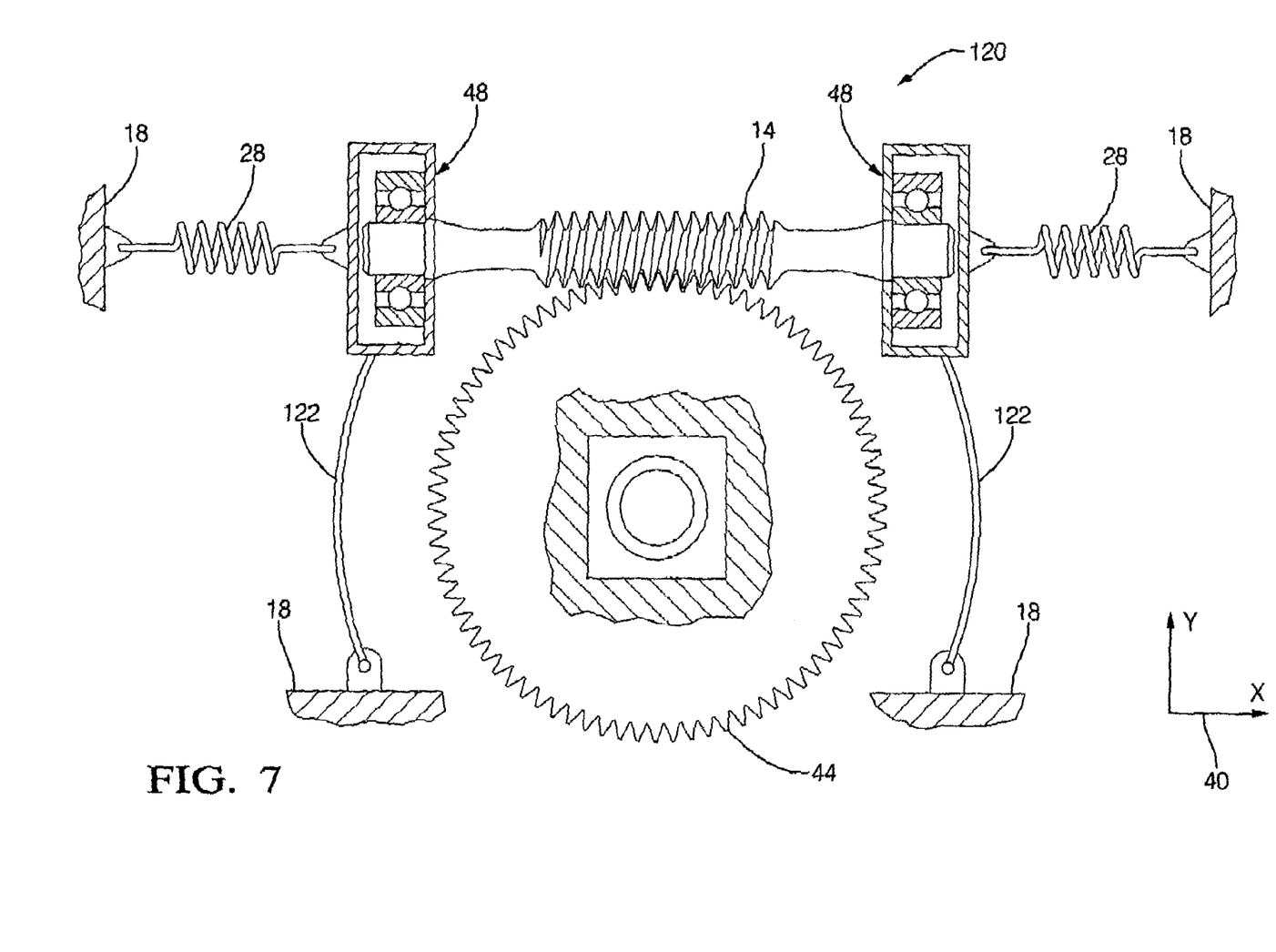
FIG. 7 depicts a diagram of operably communicating members with bowed biasing members disclosed herein.

Referring to FIG. 7, an embodiment of the invention incorporating biasing members without hard stops is shown. The schematic 120 of FIG. 7 incorporates first biasing members 122 to connect the first member 14 to the housing 18 through the bearings 48. The biasing members 122 are formed with a curved or bowed shape and are made of a flexible material with memory, such as spring steel for example, to form a flexible shaped member. The flexible shaped member creates a force that resists any straightening action to remove the bowed shape. The bowed shape can be formed to create a biasing force, on the first member 14, in the minus Y direction per the Cartesian coordinate system 40, thereby acting to pull the first member 14 towards the second member 44. The biasing members 122 have a force versus displacement relationship as shown in the graph of FIG. 3. As a result the urging force of the biasing members 122 increase nonlinearly with movement of the first member 14 in a plus Y direction. Stated another way, for small movements of the first member 14 in the plus Y direction the force in the minus Y direction from the biasing members 122 is moderate, however, with very small additional movement of the first member 14 in a plus Y direction the force in the minus Y direction from the biasing members 122 increases dramatically. The effect of the bowed biasing members 122 is to provide a preload of the first member 14 toward the second member 44 that increases to the equivalence of a hard stop while eliminating an abrupt contact when the hard stop is reached. This softening of the hard stop reduces or eliminates the potential noise associated therewith.

Figure 8:
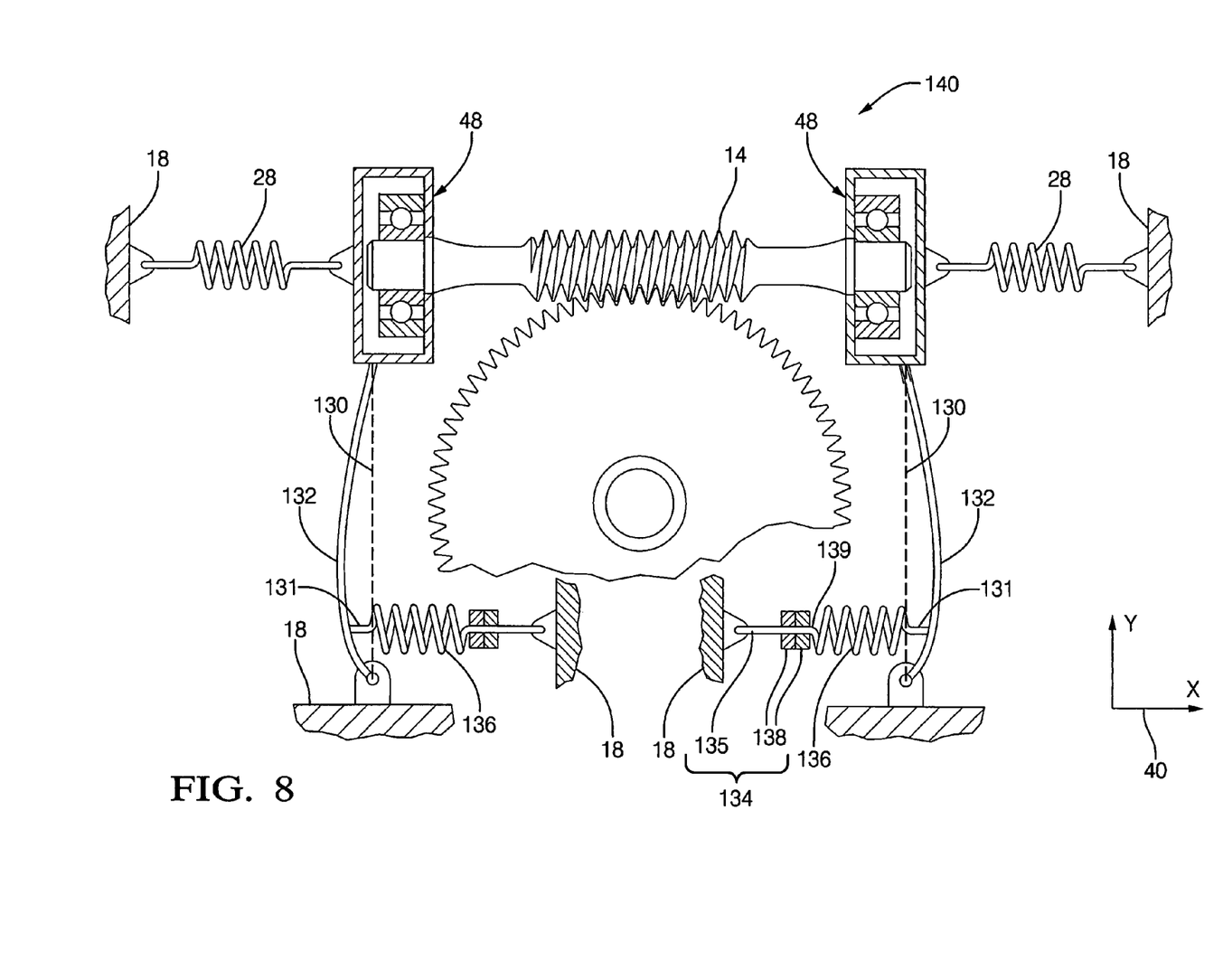
FIG. 8 depicts a diagram of operably communicating members with adjustable biasing members disclosed herein.

Another embodiment of the invention, shown as schematic 140 in FIG. 8, has third biasing members 136, depicted herein as compression springs, connected to first biasing members 132. A first end 131 of the third biasing members 136 connect to the biasing members 132 in a direction substantially perpendicular to a line 130 through the ends of the biasing members 132, thereby creating an urging force to form the biasing members 132 into bowed shapes. Unlike the biasing members 122 of FIG. 7, the biasing members 132 do not provide all the biasing force urging the first member 14, in the minus X direction, since some of the biasing force is provided by the third biasing members 136. Having separate third biasing members 136 provide some of the biasing force provides a way to adjust the total biasing force. Specifically, second ends 139 of the third biasing members 136 connect to the housing 18 through an adjustable stop 134. The adjustable stop 134 includes, for example, a threaded rod 135, attached to the housing 18, and two lock nuts 138, for tightening against each other to create an adjustable stop 134 for the third biasing members 136 along the threaded rod 135.

Figure 9:
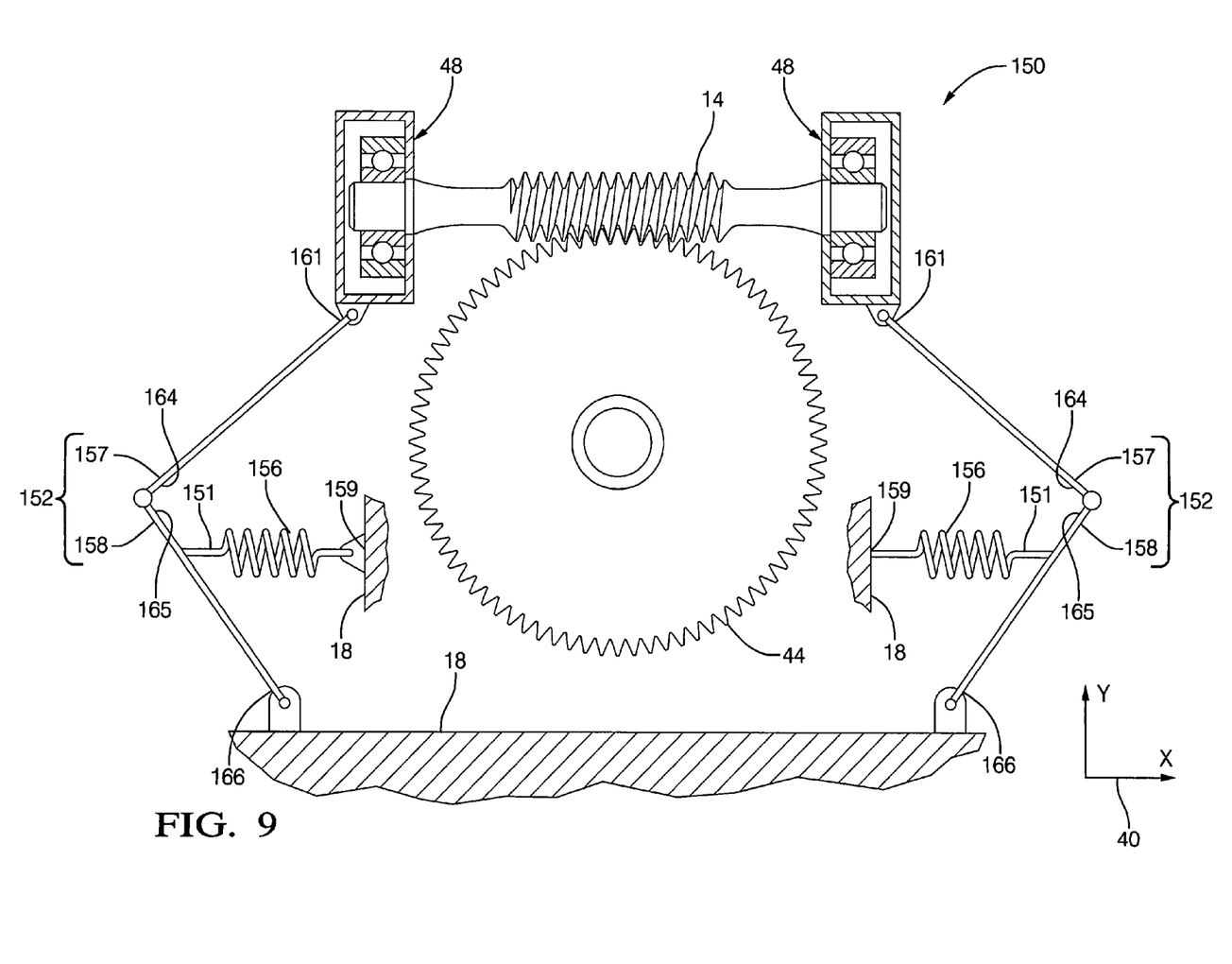
FIG. 9 depicts a diagram of an alternate embodiment of operably communicating members with adjustable biasing members disclosed herein.

Another embodiment of the invention, shown in schematic 150 of FIG. 9, has third biasing members 156 connected to first biasing members 152. A first end 151 of the third biasing members 156 connect to the biasing members 152 in a similar manner as to how the third biasing members 136 attach to the biasing members 132 of FIG. 8. Second ends 159 of the third biasing members 156 are connected to the housing 18. The first biasing members 152 are each made from a first submember 157 and a second submember 158. Both of the submembers 157 and 158 are rigid and can articulate about their ends. The first end 161 of each first submember 157 is articulatively attached to the bearing 48 of the first member 14, and the second end 164 of each first submember 157 is articulatively attached to a first end 165 of the second submember 158. The second end 166 of each second submember 158 is articulatively attached to the housing 18. The third biasing member 156 is connected to the second submember 158 near the first end 165 thereby urging the first end 165 in a manner such that the first end 161 of the first submember 157 is urged towards the second end 166 of the second submember 158, thus resulting in urging the first member 14 towards the second member 44.

It should be noted that all of the biasing members 22, 28, 52, 56, 122, 132, 136, 152, and 156 from the various embodiments shown may incorporate the soft hard stop effect as described above in reference to FIG. 9. Incorporation of these soft hard stops eliminates the noise associated with the contact of hard stops commonly associated with operably communicating members. Additionally, the travel distance through which the biasing members 22, 28, 52, 56, 122, 132, 136, 152, and 156 are actuated before the hard stop is reached may be controlled very accurately. By setting the travel distance the biasing members 22, 28, 52, 56, 122, 132, 136, 152, and 156 may reach their hard stops with very little travel thereby preventing movement of the first member 14 that could decrease engagement between the members 14 and 44 that could be detrimental to the operability of their communication.

Additionally, by configuring the biasing members 22, 28, 52, 56, 122, 132, 136, 152, and 156 to the housing 18 per embodiments of the invention as described in FIGS. 1 and 2, the first member 14 may be repositioned towards the second member 44 to more than make up for any movement of the first member 14 away from the second member 44 that could have resulted from the biasing members 22, 28, 52, 56, 122, 132, 136, 152, and 156 undergoing expansion or contraction to their limits of travel. Furthermore, embodiments of the present invention permit the use of looser tolerances regarding hardware that controls the locations of the two members 14, 44 due to the automatic adjustment that takes place regarding their positional relationship and interaction force to one another in response to the operational communication between the two members 14 and 44. It is this movement of the members 14, 44 and the automatic adjustment of their positional relationship and interaction force that helps minimize noise by preventing impacts from occurring between the two members 14, 44.

Additional noise reduction may be accomplished by limiting the transmission of vibration and noise from the first member 14 to housing 18. Additional attenuation may be achieved by forming the biasing members 22, 28, 52, 56, 122, 132, 136, 152, and 156 from layered material where the layers consist alternately of metal and polymer materials, for example. Such a construction, often referred to constrained-layer-damping, is commonly used for purposes of noise reduction.

Embodiments of the invention may include some of the following advantages: automatic reduction or elimination of backlash, reduced noise levels associated with backlash, reduced vibrational noise levels, automatic control of positional relationship of members in operable communication, automatic control of contact force between members in operable communication, automatic adjustment of mesh engagement at all load levels, improved control of meshing engagement, improved meshing efficiency, symmetry for opposite directional motion and elimination of hard stops in biasing members.

While the embodiments of the disclosed method and system have been described with reference to exemplary embodiments, it will be understood by those skilled in the art that various changes may be made and equivalents may be substituted for elements thereof without departing from the scope of the embodiments of the disclosed method and system. In addition, many modifications may be made to adapt a particular situation or material to the teachings of the embodiments of the disclosed method and system without departing from the essential scope thereof. Therefore, it is intended that the embodiments of the disclosed method and system not be limited to the particular embodiments disclosed as the best mode contemplated for carrying out the embodiments of the disclosed method and system, but that the embodiments of the disclosed method and system will include all embodiments falling within the scope of the appended claims.

What is claimed is:

1. A system to control a contact force and a positional relationship between members in operable communication, the system comprising:
   a first axially extending member having gear teeth and having a first operational position and a second operational position axially displaced from the first operational position;
   a second member having gear teeth and in operable communication with the gear teeth of the first member, a contact force and a positional relationship existing between the first member and the second member; and
   first elastic biasing members operatively connected to opposite ends of the first member and transversely extending therefrom and being configured to bias and position the first member, said first elastic biasing members applying a first biasing force on the first member in the first operational position and applying a second biasing force on the first member in the second operational position, wherein a change from the first biasing force to the second biasing force is nonlinear.

2. The system as in claim 1, including a plurality of second elastic biasing members extending axially from the first member and configured to resist movement of the first member in the axially extending direction.

3. The system as in claim 1, wherein the first member is a worm and the second member is a worm gear.

4. The system as in claim 3, wherein the operational contact force is due to contact between the gears.

5. A system to control a contact force and a positional relationship between members in operable communication, the system comprising:
   a first axially extending member having gear teeth and having a first operational position and a second operational position axially displaced from the first operational position;

a second member having gear teeth and in operable communication with the gear teeth of the first member, a contact force and a positional relationship existing between the first member and the second member;

first elastic biasing members operatively connected to opposite ends of the first member and transversely extending therefrom and being configured to bias and position the first member, said first elastic biasing members applying a first biasing force on the first member in the first operational position and applying a second biasing force on the first member in the second operational position;

a plurality of second elastic biasing members extending axially from the first member and configured to resist movement of the first member in the axially extending direction, and further comprising third elastic biasing members coupled to the first elastic biasing members, the third elastic biasing members acting with the first elastic biasing members to apply the first biasing force and the second biasing force.

6. The system as in claim 5, wherein the first elastic biasing members or the third elastic biasing members are configured as flexible shaped members.

7. The system as in claim 6, wherein the flexible shaped members are configured as bowed members.

8. A method of controlling a contact force and a positional relationship of meshing members having gear teeth:

operably coupling a first axially extending member to a second member by way of said gear teeth, said first axially extending member having a first operational position and a second operational position that is axially displaced from said first operational position;

providing first elastic biasing members operatively connected to opposite ends of said first axially extending member and transversely extending therefrom;

radially applying a first biasing force on said first axially extending member in said first operational position;

applying a second biasing force on said first member in a second operational position that is axially displaced with respect to said first operational position; and increasing the first or second biasing force in response to moving the first member from the first operational position to the second operational position.

9. The method of claim 8, further comprising:

preloading the operational contact force between the first member and the second member.

10. The method of claim 8, wherein the first member is a worm in mesh with the second member which is a worm gear.

11. The method of claim 8, further comprising:

providing a plurality of second elastic biasing members extending axially from the first member and resisting movement of the first member in the axially extending direction.

12. A system to control a contact force and a positional relationship between meshing members comprising:

a first axially extending member having gear teeth and having a first operational position and a second operational position axially displaced from the first operational position;

a second member having gear teeth and in meshing engagement with said first axially extending member; and a plurality of first elastic biasing members operatively connected to opposite ends of said first axially extending member, said plurality of first elastic biasing members pivotably connected to a housing at a second end, said plurality of first elastic biasing members transversely extending from said first axially extending member, said first elastic biasing members applying a first biasing force on said first axially extending member in said first operational position and applying a second biasing force on said first axially extending member in said second operational position.

13. The system as in claim 12, including a plurality of second elastic biasing members extending axially from the first member and configured to resist movement of the first member in the axially extending direction.

14. A system to control a contact force and a positional relationship between members in operable communication, the system comprising:

a first axially extending member having gear teeth and having a first operational position and a second operational position axially displaced from the first operational position;

a second member having gear teeth and in operable communication with the gear teeth of the first member, a contact force and a positional relationship existing between the first member and the second member; and first elastic biasing members operatively connected to opposite ends of the first member and transversely extending therefrom and being configured to bias and position the first member, said first elastic biasing members applying a first biasing force on the first member in the first operational position and applying a second biasing force on the first member in the second operational position and applying both the first and the second biasing forces in a transitional operational position between said first and said second operational positions and a change from the first biasing force to the second biasing force is non-linear.

15. The system of claim 14, wherein the second operational position is radially displaced from the first operational position.

16. A method of controlling a contact force and a positional relationship of meshing members having gear teeth:

operably coupling a first axially extending member to a second member by way of said gear teeth, said first axially extending member having a first operational position and a second operational position that is axially displaced from said first operational position;

providing first elastic biasing members operatively connected to opposite ends of said first axially extending member and transversely extending therefrom;

applying a first biasing force on said first axially extending member in said first operational position;

applying a second biasing force on said first axially extending member in said second operational position; and applying both the first and the second biasing forces in a transition operational position between said first and said second operational positions including applying a change from the first biasing force to the second biasing force in a non-linear manner.

17. The method of claim 16, wherein said second operational position is radially displaced from said first operational position.

* * * * *